United States Patent [19]

Monma et al.

[11] Patent Number: 5,327,574
[45] Date of Patent: Jul. 5, 1994

[54] MOBILE COMMUNICATION SYSTEM

[75] Inventors: Takeshi Monma; Yasushi Ozu; Mitsuo Fujyu, all of Hyogo, Japan

[73] Assignee: Mitsubishi Denki Kabushiki Kaisha, Tokyo, Japan

[21] Appl. No.: 658,481

[22] Filed: Feb. 20, 1991

[30] Foreign Application Priority Data

Feb. 23, 1990 [JP] Japan .................................. 2-43717
Feb. 23, 1990 [JP] Japan .................................. 2-43718
Feb. 23, 1990 [JP] Japan .................................. 2-43719
Sep. 13, 1990 [JP] Japan ................................ 2-242901

[51] Int. Cl.$^5$ ............................................. H04Q 7/00
[52] U.S. Cl. ................... 455/33.2; 455/56.1; 455/58.1; 455/63; 379/60
[58] Field of Search ............ 455/54.1, 54.2, 56.1, 455/63, 33.1, 33.2, 58.1; 379/60

[56] References Cited

U.S. PATENT DOCUMENTS 4,723,266  2/1988  Perry ................................ 455/33.4
5,042,082  8/1991  Dahlin .............................. 455/33.2

FOREIGN PATENT DOCUMENTS 8803762  10/1988  Sweden.

OTHER PUBLICATIONS

40th IEEE Vehicular Technology Conference, May 6-9, 1990, "Public Land Mobile Network Interworking with ISDN".

Primary Examiner—Reinhard J. Eisenzopf
Assistant Examiner—Andrew Faile
Attorney, Agent, or Firm—Rothwell, Figg, Ernst & Kurz

[57] ABSTRACT

A mobile communication system comprises a switching station, base stations to constitute respective zones, and mobile stations moving in a service zone formed by the communication zones. Plural base stations exist in one communication zone, and one specific channel among control communication channels is allocated to one of the base stations. The mobile station transmits general communication request using one specific channel during request of the general communication. Or the control communication channel is allocated only to one station among the base stations. The mobile station has a circuit for measuring the signal-to-noise ratio, and if the signal-to-noise ratio is deteriorated, a signal indicating this state is transmitted to the switching station.

7 Claims, 16 Drawing Sheets

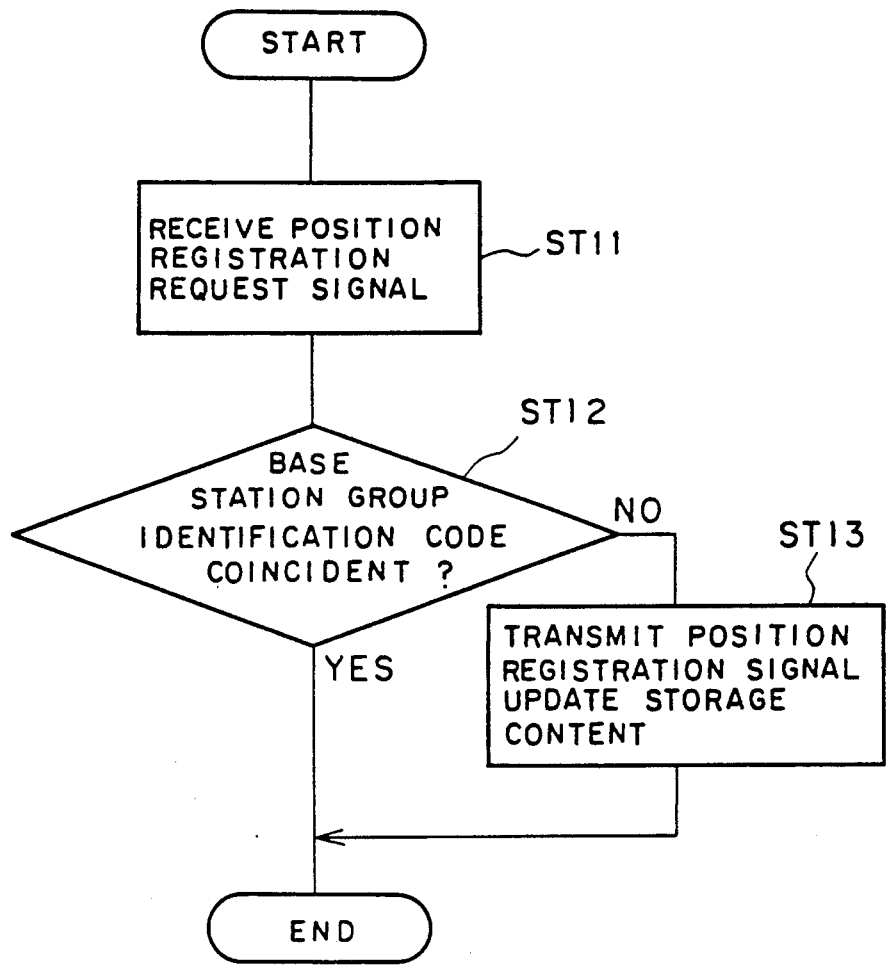

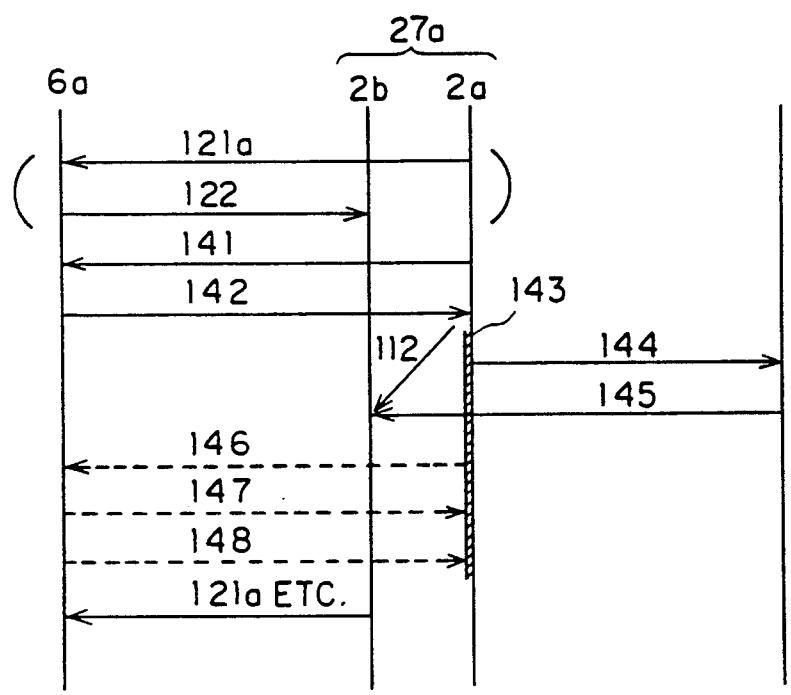

MOBILE COMMUNICATION SYSTEM

BACKGROUND OF THE INVENTION

1. Field of the Invention

The present invention relates to a mobile communication system constituted by a switching station, base stations connected to the switching station, and a plurality of mobile stations moving in a service area formed by communication zones due to the base stations.

2. Description of the Prior Art

FIG. 1 is a system constitution diagram showing a mobile communication system in the prior art disclosed, for example, in Japanese patent application laid-open No. 38940/1985. In FIG. 1, the mobile communication system comprises a switching station 1, base stations 2a-2j connected to the switching station 1, a wired network 3 connecting between the switching station 1 and the base stations 2a-2j, communication zones 4a-4j of the base stations 2a-2j, a crossover zone 5 where the communication zones 4a-4j intersect each other, and a mobile station 6 moving in a service area 7 formed by the communication zones 4a-4j.

The base stations 2a-2j and the mobile stations 6 have a speech radio channel (hereinafter referred to as "S-ch") for speech, and a control radio channel (hereinafter referred to as "C-ch") for communication of communication control signals. These channels S-ch and C-ch are constituted by an upward channel from the mobile station 6 to the base stations 2a-2j, and a downward channel from the base stations 2a-2j to the mobile station 6 respectively.

Next, operation will be described. FIG. 2 is a timing chart showing signals transmitted or received between the base stations 2a-2j and the mobile stations 6 in the mobile communication system in such constitution. The operation will be described in an example of position registration as follows.

When the position information of the mobile station 6 becomes necessary, the base stations 2a-2j transmit the position registration request signals (a) continuously using the downward channel of C-ch. The mobile station 6 at non-speaking state waits the position registration request signals (a) from the base stations 2a-2j. When the position registration request signal (a) is received in the communication zone where the mobile station 6 is located at present, for example, in the downward channel of C-ch from the base station 2a of the communication zone 4a, if the base station identification code included in the position registration information signal (a) is different from that stored by the mobile station 6 at the last position registration before then, the downward channel of S-ch with an empty signal (b) transmitted from the base station 2a is detected.

When the mobile station 6 detects a signal of the downward channel of S-ch with the empty signal (b) transmitted, the mobile station 6 transmits a position registration signal (c) in the upward channel of S-ch corresponding thereto. The switching station 1 performs the position registration based on the position information. From taking synchronization of the position registration signal (c) until finishing its reception, the base station 2a transmits a transmission inhibiting signal (d) to the downward channel corresponding to the upward channel of S-ch where the position registration signal (c) is transmitted. Thereby the transmission of the position registration signal (c) to the same upward channel from other mobile station 6 can be prevented.

In the mobile communication system in the prior art constituted as above described, since only one base station 2a-2j is installed at the same communication zone 4a-4j, even if the emergency state occurs during use of the channel S-ch by the base station 2a-2j, the general communication cannot be performed from the mobile station 6 within the corresponding communication zone 4a-4j. Also even if the mobile station 6 intends to perform the general communication using the channel C-ch, the general communication cannot be normally performed due to collision of the channel C-ch with other mobile station or other base station.

When the communication zones 4a-4j are constituted simply by a plurality of base stations, the collision of C-ch of these stations causes the communication failure. Even if the time difference is taken for the transmission of C-ch in order to avoid such collision of C-ch, since the base station identification code is different per each base station, the mobile station 6 even in the same communication zone responds to the position registration request signal from each base station of the communication zone. Also the mobile station 6 storing the base station identification code of the base station of some communication zone waits signals in the communication processing including the base station identification code and does not respond to signals in the same communication processing including the base station identification code from other base station in the same communication zone thereby a long time is required until the execution of the communication processing.

FIG. 3 is a system constitution diagram of another mobile communication system in the prior art disclosed, for example, in Japanese patent application laid-open No. 147903/1977. In FIG. 3, the mobile communication system comprises a switching station 1, base stations 2a, 2b connected to the switching station 1, a telephone terminal 20 incorporated in the switching station 1, communication zones 4a, 4b of the base stations 2a, 2b, a mobile station 6 moving in a service area formed by the communication zones 4a, 4b, wired networks 3a, 3b connecting the base stations 2a, 2b to the switching station 1, information of signal-to-noise ratio (hereinafter referred to as "SN ratio") 17a, 17b transmitted from the base station 2a or 2b to the switching station 1, base station control signals 18a, 18b for the switching station 1 to control the base stations 2a, 2b, and speech paths 19a, 19b installed in the switching station 1 for connecting the base stations 2a, 2b to the telephone terminal 20.

The base stations 2a, 2b and the mobile station 6 have a speech radio channel (hereinafter referred to as "S-ch") for speech, and a control radio channel (hereinafter referred to as "C-ch") for communication of communication control signals. These channels S-ch and C-ch are constituted by an upward channel from the mobile station 6 to the base stations 2a, 2b, and a downward channel from the base stations 2a, 2b to the mobile stations 2a, 2b to the mobile station 6 respectively.

Next, operation will be described. Assume now that speech exists between the telephone terminal 20 and the mobile station 6 in the communication zone 4b through the base station 2b.

Then the switching station 1 detects the movement of the mobile station 6 in following manner. That is, the base station 2b always measures the SN ratio of signals from the mobile station 6, and if the measured value is the standard value or more, the SN ratio information 17b is transmitted, for example, as "1" to the switching station 1. If the mobile station 6 is moved to the communication zone 4a, the measured value of the SN ratio in the base station 2b becomes the standard value or less. Consequently, the SN ratio information 17b from the base station 2b becomes "0" for example.

Since the SN ratio information 17b becomes "0", the switching station 1 detects the movement of the mobile station 6 to the outside of the communication zone of the base station 2b, and executes changing of the channel during speech. The switching station transmits the control signal 18a to the base station 2a adjacent to the communication zone, and commands the reception of the channel S-ch with frequency used by the mobile station 6 in the communication zone 4b. The base station 2a receives the channel S-ch, and if the SN ratio is the standard value or more, the SN ratio information 17a is transmitted as "1" to the switching station 1. On receiving the information, the switching station 1 changes the speech path 19a into the speech path 19b, and realizes the speech in the mobile station 6—the base station 2a—the switching station 1—the telephone terminal 20, and restores the base station 2b.

Since other mobile communication system in the prior art is constituted as above described, the switching station 1 must always measure and monitor the SN ratio of the received signals from the mobile station 6 regarding all base stations 2a, 2b. Also when the movement of the mobile station between the communication zones 4a, 4b is detected, the SN ratio information must be collected regarding all base stations at the periphery of the communication zone 4b before the movement simultaneously or in sequence, in matching with the channel S-ch of frequency used by the mobile station 6 and the base station 2b within the communication zone 4b before the movement, until the communication zone 4a of the movement destination can be found. Consequently, problems exist in that large burden is applied to the processing.

SUMMARY OF THE INVENTION

In view of the above-mentioned problems in the prior art, an object of the invention is to provide a mobile communication system wherein even when speech by channel S-ch between a mobile station and a base station and a base station is performed within the same communication zone the general communication service can be normally realized.

In order to attain the foregoing object, in a mobile communication system according to the invention, the same communication zone is constituted by a plurality of base stations and a radio channel to be used only in the specific case is allocated to one station among the base stations, and the base station is rendered the normally receiving state and a signal on an upward channel of the radio channel to be used only in the specific case from a mobile station within the communication zone is waited, and if the general communication request signal exists in the channel, in accordance with the information included in the request, the general communication signal is transmitted using a control radio channel (hereinafter referred to as "Cn-ch") to be used for ordinary communication control of the prescribed communication zone or a downward channel of S-ch in use.

The base station with the radio channel to be used only in the specific case allocated thereto is in the normally receiving state, and if a general communication request signal exists on an upward channel of the radio channel from a mobile station within the communication zone, in accordance with the information included in the general communication request signal, the switching station commands the general communication to the base stations of all communication zones or the specific communication zone, and the base station receiving the command of the general communication towards the general communication signal to the mobile station using the upward channel of Cn-ch or S-ch, thereby the mobile communication system is realized in that while ordinary service of the mobile communication system using Cn-ch and S-ch is performed for each mobile station within the corresponding communication zone, performing of service such as the general communication with higher priority can be always secured.

Another object of the invention is to provide a mobile communication system wherein collision of C-ch or each base station of the same communication zone can be avoided when a plurality of base stations exist in the communication zone, and such useless processing can be avoided that the mobile station responds to the position registration request signals of the plural base stations in the same communication zones, and delay of the time until the execution of the prescribed communication processing can be prevented.

In order to attain the foregoing object, in a mobile communication system according to the invention, when a plurality of base stations constitute the same communication zone, allowance of starting the communication of a control signal by C-ch and the communication by S-ch is supplied only to one station at most among the base stations to constitute the same communication zone, and the base station supplied with the allowance is changed in sequence between the respective base stations.

A mobile communication system is realized in that allowance of starting communication of a control signal by C-ch and of starting communication by S-ch within the same communication zone constituted by a plurality of base stations is supplied only to one station at most among the base stations within the communication zone, and the base station supplied with the allowance is changed in sequence between respective base stations within the same communication zone, thereby the collision of C-ch caused by existence of a plurality of base stations within the same communication zone can be prevented.

A further object of the invention is to provide a mobile communication system wherein burden of processing of a switching station at the changing state of channels during speech can be reduced.

In order to attain the foregoing object, in a mobile communication system according to the invention, the SN ratio measuring function of received signals is supplied not only to the base station but also to the mobile station, and the mobile station during speech always measures the SN ratio of S-ch, and on detecting the deterioration of the measured value, the mobile station is automatically transferred to C-ch and transmits the speech continuing request signal, and one of the base stations receiving the speech continuing request signal transmits the mobile station call signal to the mobile station.

The mobile station during speech always measures the SN ratio of S-ch, and when the measured value becomes the standard value or less, the mobile station temporarily interrupts the speech on the S-ch and is automatically transferred to the speech continuing request signal, and one of the base stations receiving the speech continuing request signal transmits the mobile station call signal and changing of S-ch is performed based on the mobile station call signal, thereby the channel changing system during speech is realized in reducing the burden of the switching station at the changing state of channels during speech.

BRIEF DESCRIPTION OF THE DRAWINGS

FIG. 16 is a flow chart showing processing procedure regarding a position registration signal;

FIG. 17 is an explanation diagram showing an example of constitution of a memory storing position registration information;

FIG. 18 is an explanation diagram showing a display example in a position display device;

FIG. 19 is a sequence chart showing sequence from calling to speech end between a base station and a mobile station;

DETAILED DESCRIPTION OF THE PREFERRED EMBODIMENTS

Figure 1:
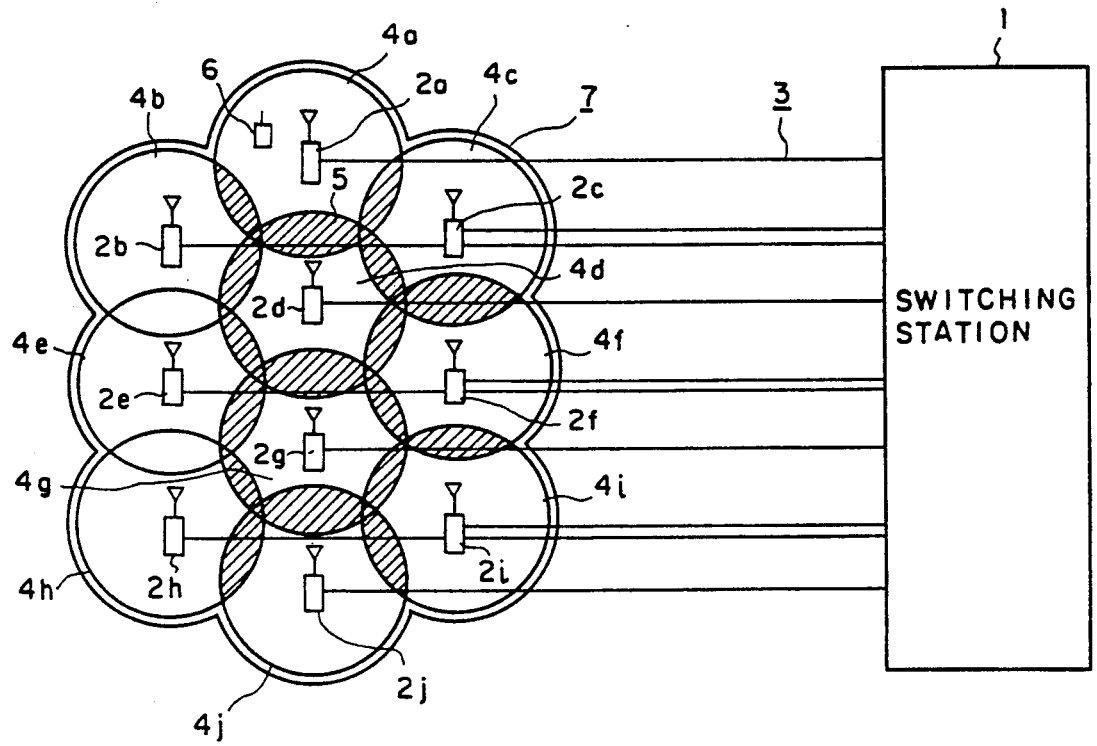
FIG. 1 is a system constitution diagram showing a mobile communication system in the prior art.
Figure 4:
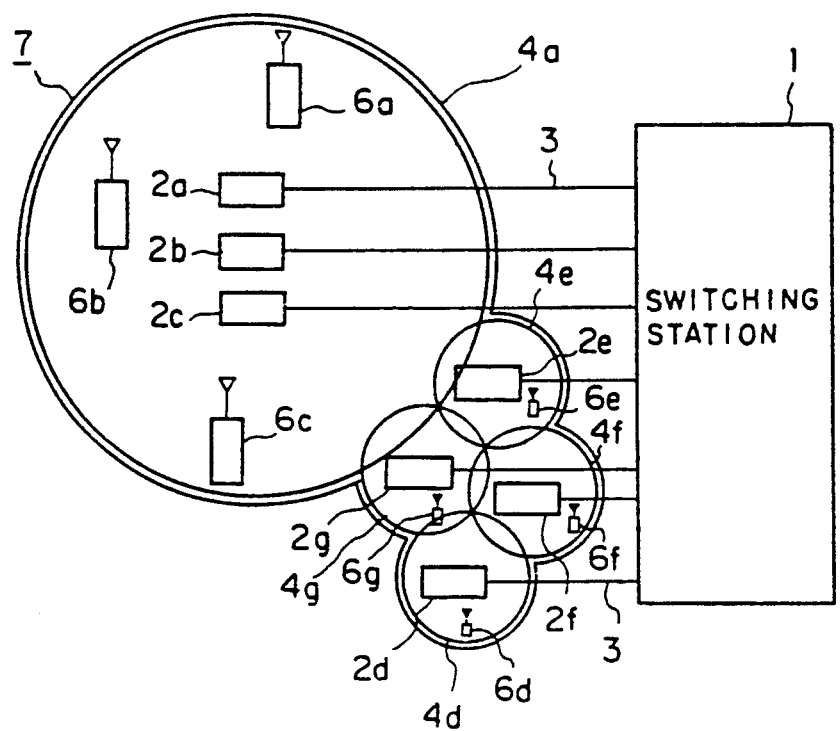
FIG. 4 is a system constitution diagram showing a mobile communication system in an embodiment of the invention.

An embodiment of the invention will be described referring to the accompanying drawings as follows. In FIG. 4, a mobile communication system in the embodiment comprises a switching station 1, base stations 2a-2g, a wired network 3, communication zones 4a, 4d-4g, and a service area 7. Parts in FIG. 4 designated by the same reference numerals as those in FIG. 1 are the same as or similar to the parts in the prior art, and the detailed description shall be omitted. Also mobile stations 6a-6g corresponding to the mobile station 6 shown in FIG. 1 move in the service area 7.

The mobile communication system in the embodiment is different from the system of the prior art in that one communication zone (for example, 4a) is constituted by a plurality of (for example, three) base stations (for example, 2a-2c). In FIG. 4, regarding each of the communication zones 4d-4g, one base station 2d-2g only are shown for the simplification.

Figure 5:
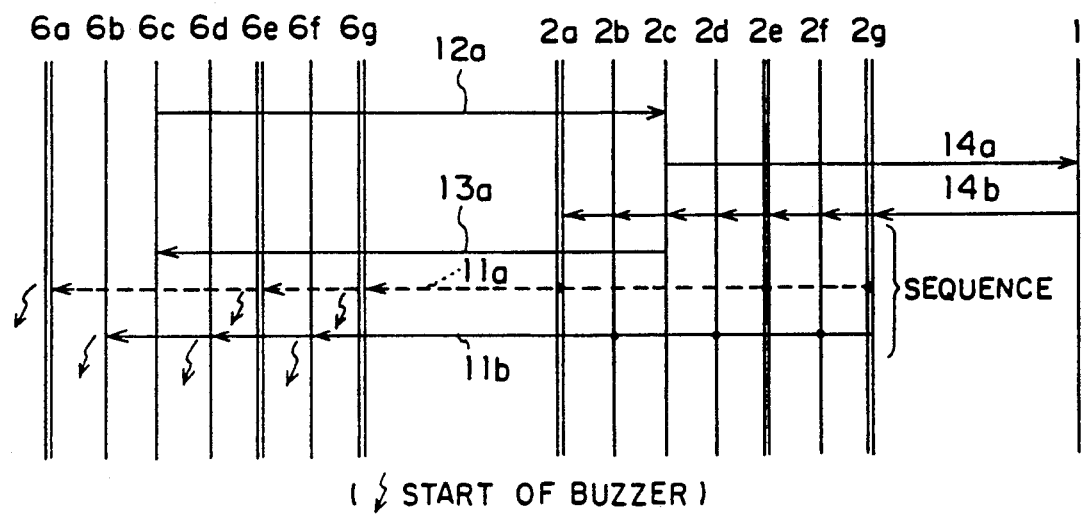
FIG. 5 is a sequence chart showing processing sequence of general communication in the system of FIG, 4.

Next, operation will be described. In this connection, FIG. 5 is a timing chart showing processing sequence of the general communication, and FIG. 6 is an explanation diagram showing format of signals transmitted or received in this case.

In FIG. 4, the base stations 2a-2c combined in a group constitute the same communication zone 4a, and when the communication is performed between the mobile stations 6a-6c within the communication zone 4a, the base stations 2a-2c have the same base station identification code imaginarily, and the communication with the mobile stations 6a-6c by Cn-ch (channels excluding Ce-ch among C channels) is performed by stations not performing the communication on the S-ch among the base stations 2a, 2b, and the base station 2c is allocated by the radio channel (hereinafter referred to as "Ce-ch") to be used only in the specific case among the C channel and is in the normally communication state. In this case, the base station 2a and the mobile station 6a perform the communication on the S-ch, and the Cn-ch is allocated to the base station 2b. Similar state applies also to other communication zones 4d-4g.

Figure 6A:
FIGS. 6(a)-6(d) are an explanation diagram showing format of signals transmitted or received in the processing of FIG, 5.
Figure 6B:

In this case, it is assumed that the mobile station 6c transmits the general communication request signal 12a onto the Ce-ch by operation of the functional key installed on the mobile station 6c. The general communication request signal 12a as shown in FIG. 6(a) includes the identification code (C) of the mobile station 6c, the base station identification code Ba of the base stations 2a-2c, and the general communication request code (A). The general communication request signal 12a is received by the base station 2c, and the information of the signal shown in FIG. 6(b) is transmitted to the switching station 1, and further the switching station 1 receiving the information 14a transmits the general communication command 14b also shown in FIG. 6(b) to each of the base stations 2a-2g.

Figure 6C:
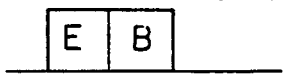
Figure 6D:
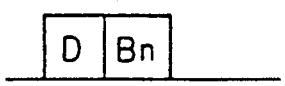

The base station 2c receiving the general communication command 14b transmits the general communication request receiving signal 13a to the mobile station 6c. As shown in FIG. 6(c), the general communication request signal 13a includes the general communication request receiving code (E) and the base station identification code Ba. On the other hand, each of other base stations 2a, 2b, 2d-2g transmits the general communication signal 11a or 11b onto the channel S-ch or Cn-ch in use. The general communication signal 11a is transmitted from the base stations 2a, 2e, 2g during communication by S-ch shown by double line in FIG. 5 onto the S-ch, and the general communication signal 11b is transmitted from the base stations 2b, 2d, 2f not performing communication by S-ch shown by single line in FIG. 5 onto the Cn-ch. The general communication signals 11a, 11b as shown in FIG. 6(d) include the base station identification code Bn (n: a, d, e, f or g) of each communication zone. Each of the mobile stations 6a, 6b, 6d–6g receiving the general communication signals 11a, 11b rumbles a buzzer provided therewith and informs a user of the general communication. The buzzer keeps rumbling unless the user stops it.

When the user knows the general communication by the rumbling of the buzzer, he stops the buzzer and enters the general communication. The communication after stopping the rumbling of the buzzer may be one-directional speech from one mobile station transmitting request of general communication to other mobile station or teleconference communication between these mobile stations.

In the above-mentioned embodiment, although the general communication is performed for all mobile stations 6a–6g within the service area 7, the mobile stations 6a–6g may be divided into groups and the general communication may be performed only for the specific group.

Figure 7:
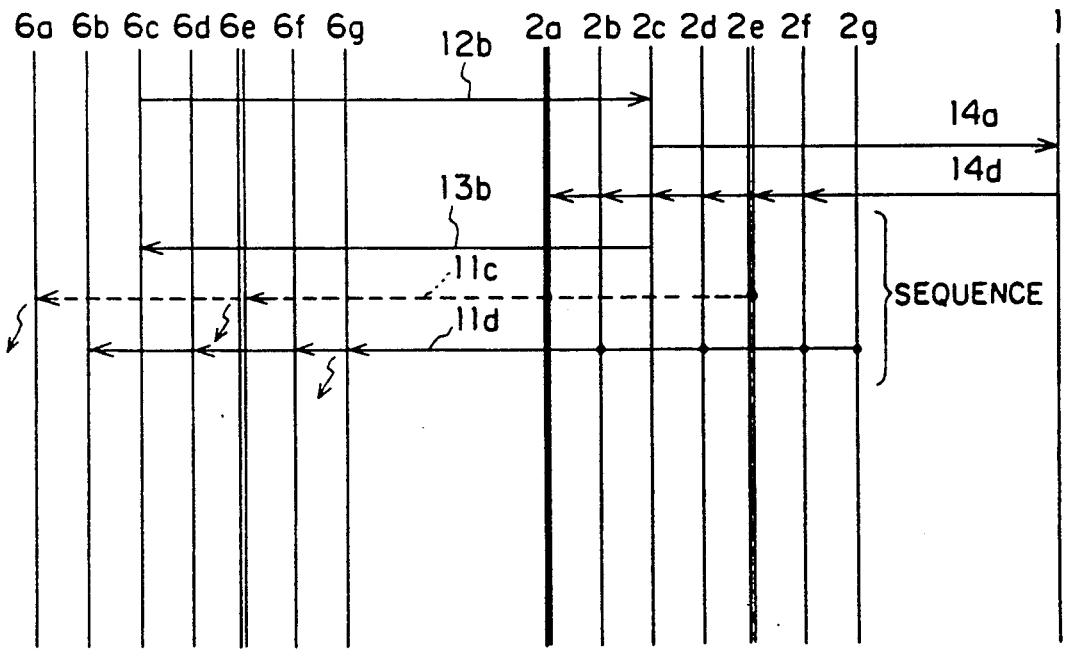
FIG. 7 is a sequence chart showing processing sequence of other general communication in the system of FIG, 4.

FIG. 7 is a sequence chart showing the processing sequence of the general communication in such embodiment, and FIG. 8 is an explanation diagram showing format of signals transmitted or received then. In this case, for example, the mobile stations 6a, 6c, 6e, 6g are made the first group, and the mobile stations 6b, 6d, 6f are made the second group, and each group is supplied with mobile station group identification code FN1 or FN2 peculiar thereto respectively. Each of the mobile stations 6a–6g stores the mobile station group identification code FN1 or FN2 of the group to which each station belongs.

Figure 8A:
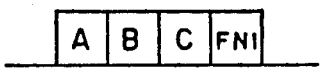
FIGS. 8(a)-8(d) are an explanation diagram showing format of signals transmitted or received in the processing of FIG, 7.
Figure 8B:

In the mobile station 6c, the general communication request signal 12b with the mobile station group identification code FN1 shown in FIG. 8(a) added thereto is transmitted onto the Ce-ch by operation of a functional key provided on the mobile station 6c and subsequently by operation of a mobile station group identification code transmission key. The general communication request signal 12b is received by the base station 2c and the information 14c of the signal is transmitted to the switching station 1, which transmits the general communication command 14d to each of the base stations 2a–2g. The mobile station group identification code FN1 is added also to the information 14c and the general communication command 14d as shown in FIG. 8(b).

Figure 8C:
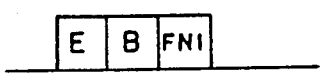
Figure 8D:

On receiving the general communication command 14d, the base station 2c transmits the general communication request receiving signal 13b with the mobile station group identification code FN1 added thereto as shown in FIG. 8(c) to the mobile station 6c. On the other hand, other base stations 2a, 2b, 2d–2g transmit the general communication signal 11c or 11d with the mobile station group identification code FN1 added thereto as shown in FIG. 8(d) onto the channel S-ch or Cn-ch in use. Each of the mobile stations 6a, 6b, 6d–6g receiving the general communication signals 11c, 11d rumbles a buzzer and informs a user of the general communication, only when the mobile station group identification code FN1 on the general communication signals 11c, 11d is coincident with the mobile station group identification code FN1 or FN2 stored in each mobile station. Consequently, the buzzer rumbles in the mobile stations 6a, 6e, 6g included in the same group as that of the mobile station 6c.

In the above-mentioned embodiment, although the mobile station group identification code FN1 or FN2 is stored in each of the mobile stations 6a–6g, the switching station 1 may have the mobile station group identification code FN1 or FN2 and the information of the mobile stations included in the group and the communication to each mobile station of the group may be performed by processing of the switching station 1.

The embodiment has been described where the mobile stations 6a–6g are divided into groups. However, in the mobile communication system according to the invention, the communication zones 4a, 4d–4g may be divided into groups and the general communication may be performed only to the specific group.

Figure 9:
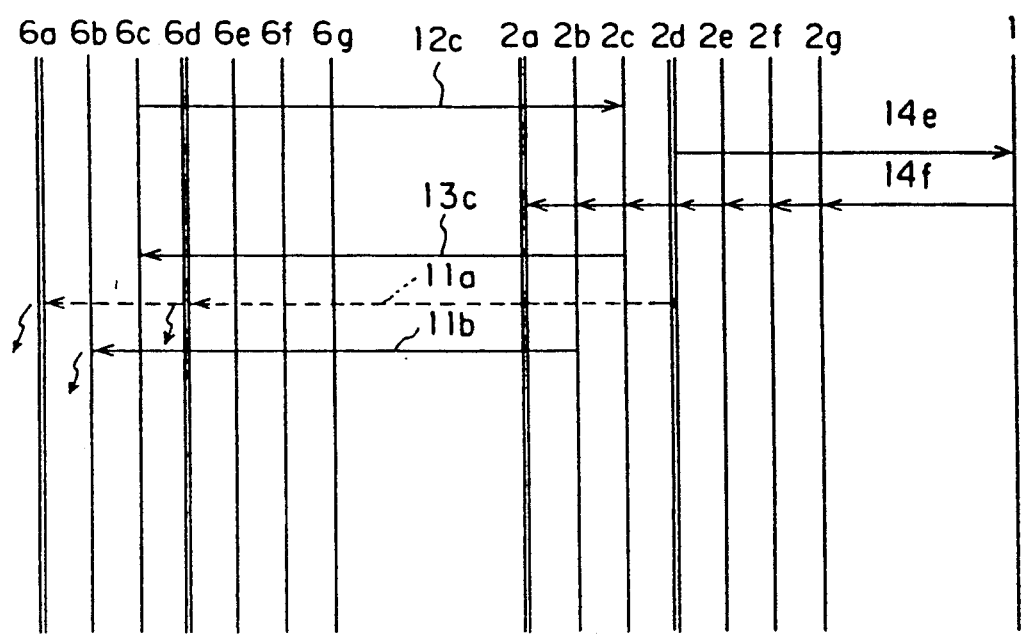
FIG. 9 is a sequence chart showing processing sequence of further general communication in the system of FIG, 4.

FIG. 9 is a sequence chart showing processing sequence of the general communication in such embodiment, and FIG. 10 is an explanation diagram showing format of signals transmitted or received then. In this case, for example, the communication zones 4a, 4d are made the first group and the communication zones 4e–4g are made the second group, and each group is allocated with the base station group identification code HN1 or HN2 peculiar thereto respectively. Each of the base stations 2a–2g within the communication zones 4a, 4d–4g stores the base station group identification code HN1 or HN2 of the group to which the communication zones 4a, 4d–4g belong.

Figure 10A:
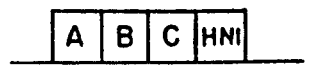
FIGS. 10(a)-10(d) are an explanation diagram showing format of signals transmitted or received in the processing of FIG, 9.
Figure 10B:

In the mobile station 6c, the general communication request signal 12c with the base station group identification code HN1 shown in FIG. 10(a) added thereto is transmitted onto the Ce-ch by operation of a functional key provided on the mobile station 6c and subsequently by operation of a mobile station group identification code transmission key. The general communication request signal 12c is received by the base station 2c and the information 14e of the signal is transmitted to the switching station 1, which transmits the general communication command 14f to each of the base stations 2a–2g. The base station group identification code HN1 is added to the information 14e and the general communication command 14f as shown in FIG. 10(b).

Figure 10C:
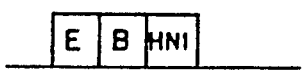
Figure 10D:

On receiving the general communication command 14f, the base station 2c transmits the general communication request receiving signal 13c with the base station group identification code HN1 added thereto as shown in FIG. 10(c) to the mobile station 6c. On the other hand, other base stations 2a, 2b, 2d–2g transmit the general communication signals 11a, 11b shown in FIG. 10(d), only when the base station group identification code HN1 on the general communication command 14f is coincident with the base station identification information HN1 or HN2 stored in each base station. Consequently, the general communication signals 11a, 11b are transmitted from the base stations 2a, 2b, 2d having the identification information HN1. Each of the mobile stations 6a–6d moving in the communication zones 4a, 4b receiving the general communication signals 11a, 11b rumbles a buzzer and informs a user of the general communication.

Also in this case, the switching station 1 may have the base station group identification code HN1 or HN2 and the information of the base stations included in the group, and the general communication command 14f may be transmitted to each of the base stations of the group by processing of the switching station 1 and the general communication may be applied to the communication zone. Further, the communication zone of the destination station may be assigned not only from the base station previously set but also from the mobile station at the start state of the general communication.

In each embodiment as above described, although the user is informed of the general communication by the rumbling of the buzzer, the visual display using a light emission diode, a liquid crystal indicator or the like is possible, and in transmission of the general communication request signal, the specific S-ch may be used in place of the Ce-ch. In any case, similar effects to the above-mentioned embodiments can be obtained.

According to the invention as above described, a plurality of base stations are arranged in one communication zone, and one of the base stations is made the normally receiving state and the radio channel to be used only in the specific case is allocated to the base station and used for the communication of the emergency signal such as general communication request, thereby the mobile communication system can be obtained in that the emergency signal does not collide with a signal for ordinary speech control and the general communication of high accuracy can be performed.

Figure 11:
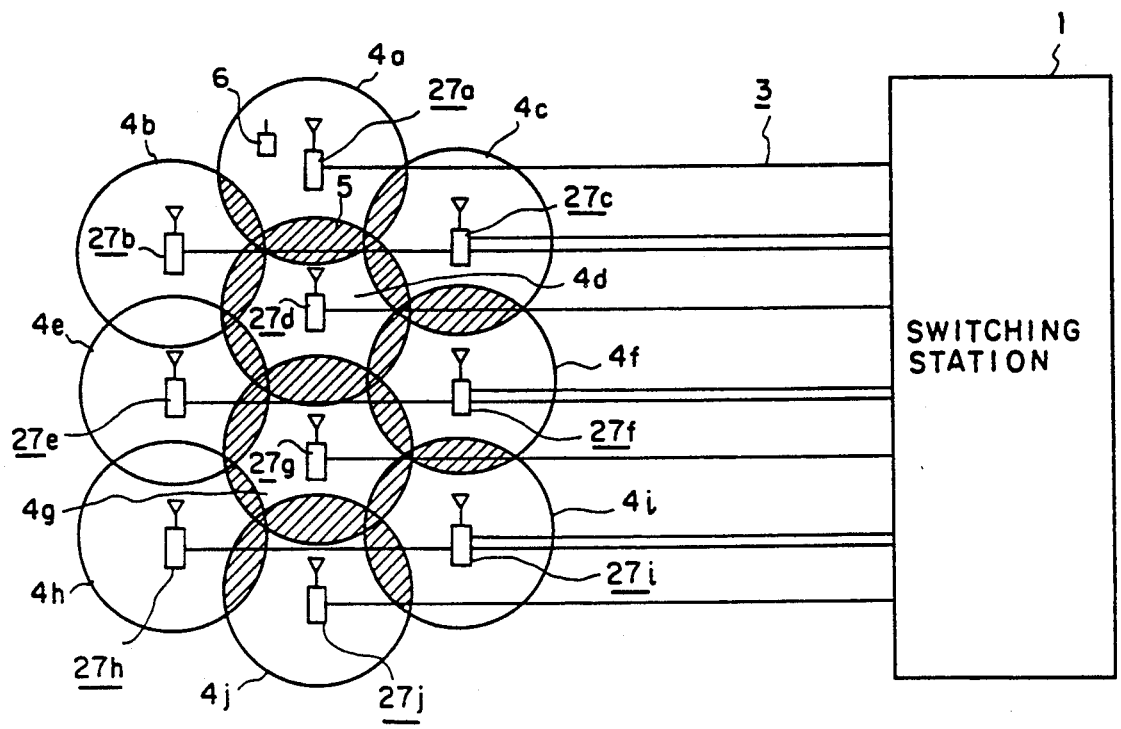
FIG. 11 is a system constitution diagram showing a mobile communication system in another embodiment of the invention.

FIG. 11 is a system constitution diagram showing a mobile communication system in another embodiment of the invention. In FIG. 11, the mobile communication system comprises a switching station 1, a wired network 3, communication zones 4a–4j, a crossover zone 5, and a mobile station 6. Parts in FIG. 11 designated by the same reference numerals as those in FIG. 1 are the same as or similar to the parts in the prior art, and the detailed description shall be omitted. Numerals 27a–27j designate base station groups each comprising plural base stations or single base station, and the communication zones 4a–4j are constituted by these base station groups 27a–27j.

Figure 12:
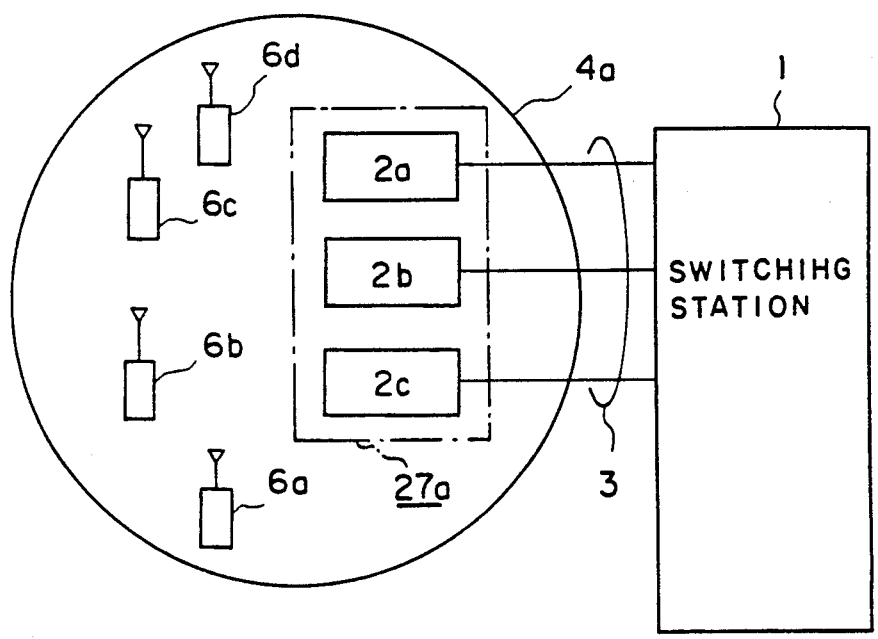
FIG. 12 is a constitution diagram showing constitution of a base station group of FIG. 11.

FIG. 12 is a block diagram showing constitution of the base station group 27a shown in FIG. 11. In FIG. 12, three base stations 2a–2c form the base station group 27a, and are connected through the wired network 3 to the switching station 1 respectively. Mobile stations 6a–6d are within the communication zone 4a constituted by the base station group 27a, and correspond to the mobile station 6 shown in FIG. 11.

Figure 13:
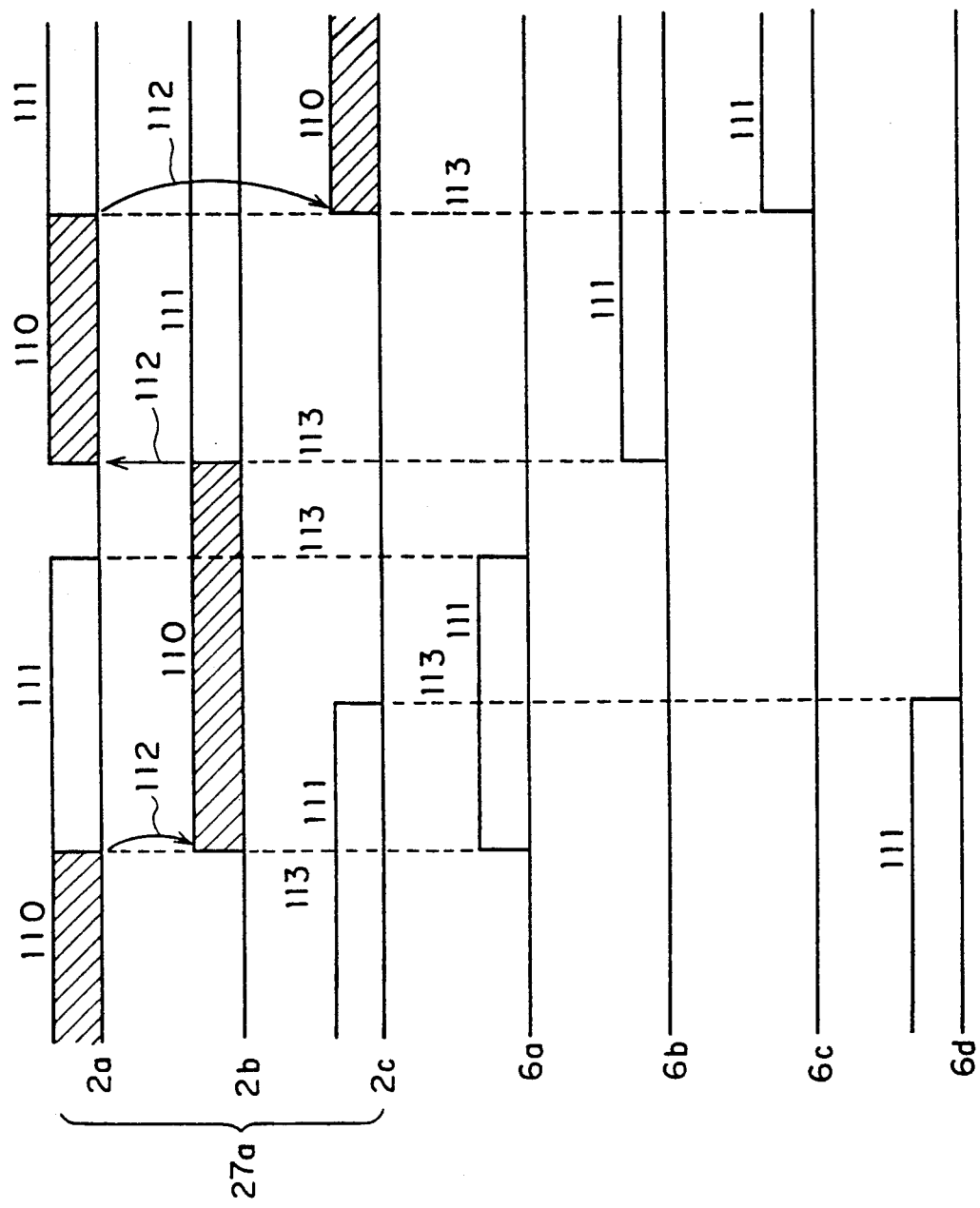
FIG. 13 is a timing chart showing allocation changing of C-ch and S-ch.

Next, operation will be described. In this connection, FIG. 13 is a timing chart showing an example of use allowance of C-ch and movement of start allowance of speech by S-ch. In FIG. 13, numeral 110 designates use allowance of C-ch and start allowance of speech by S-ch (hereinafter referred to as "C-ch, S-ch allocation"), numeral 111 designates communication between the base stations 2a–2c and the mobile stations 6a–6d, numeral 112 designates movement of the C-ch, S-ch allocation, and numeral 113 designates correspondence of speech between the base stations 2a–2c and the mobile stations 6a–6d in broken line.

In the base station group 27a, it is assumed that the priority of the C-ch, S-ch allocation is highest at the base station 2a, and set in the order of the base station 2b and the base station 2c. When the communication 111 on the S-ch is started between the base stations 2a–2c supplied with the C-ch, S-ch allocation until then and the mobile stations 6a–6d, the movement 112 of the C-ch, S-ch allocation is always performed for the station having the highest priority among the base stations 2a–2c which do not perform the communication 111 on the S-ch. However, the movement of the C-ch, S-ch allocation is performed only when the communication does not exist on the C-ch. In this case, the C-ch, S-ch allocation means that communication of a control signal with the mobile stations 6a–6d is performed using the C-ch, and that when the call originating from new mobile stations 6a–6d is performed or the call incoming to new mobile stations 6a–6d is performed, allowance of transferring to the communication on the S-ch between the base stations 2a–2c and the mobile stations 6a–6d is supplied to the base stations 2a–2c. Also the channel S-ch is selected so that the interference can not be easily produced between the base stations 2a–2c and between the base station groups 27a–27j.

Figure 14:
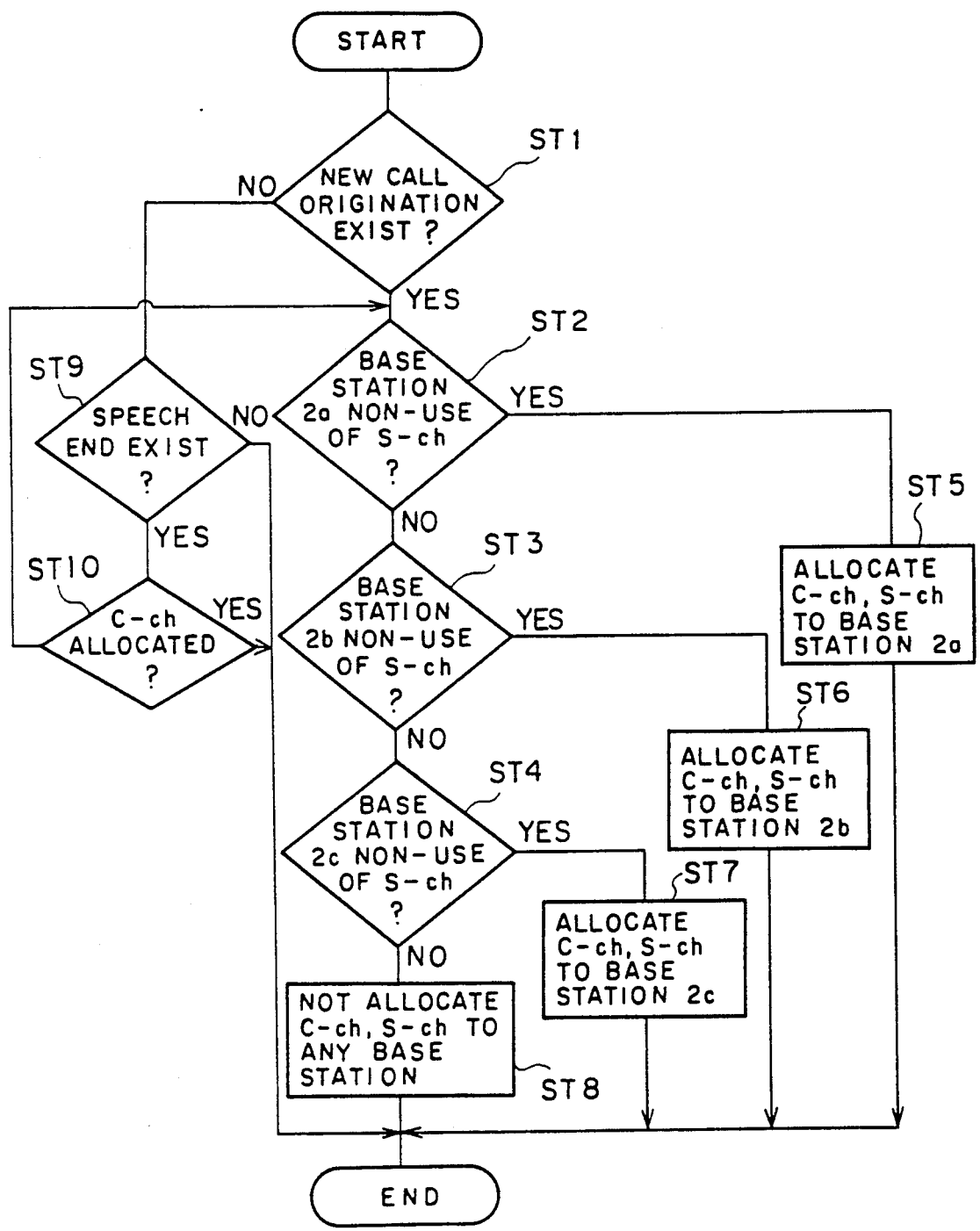
FIG. 14 is a flow chart showing processing procedure of allocation changing.

FIG. 14 is a flow chart showing the above-mentioned control procedure. That is, if new call originating is detected at step ST1, S-ch being not in use in each of the base stations 2a–2c is detected in accordance with the priority at steps ST2–ST4. If the S-ch being not in use is detected in any of the base stations 2a–2c, the C-ch, S-ch allocation is performed to the base stations 2a–2c at steps ST5–ST7. If the S-ch being not in use does not exist even in the base station 2c, the C-ch, S-ch allocation is not performed to any of the base stations 2a–2c (step ST8), and the processing is finished. Also if it is detected that the call without C-ch, S-ch allocation is not finished at steps ST9, ST10, the process is returned to step ST2, and the detection of the S-ch being not in use in the base stations 2a–2c is performed again.

Figure 15:
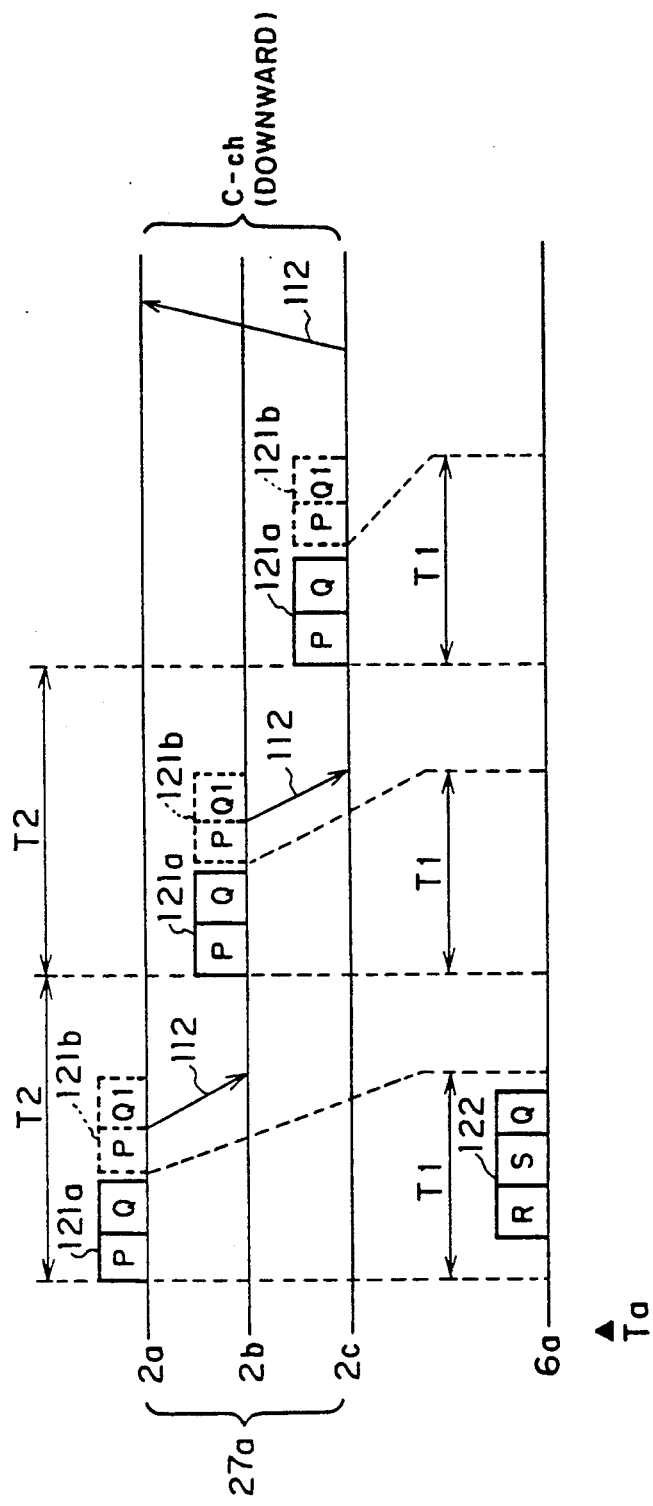
FIG. 15 is a timing chart showing transmission timing of signals transmitted or received during position registration.

Next, control of the position registration will be described. FIG. 15 is a timing chart showing an example of timing of the position registration executed by the base stations 2a–2c and the mobile station 6a. In FIG. 15, numeral 121a designates a position registration request signal of the base station group 27a, numeral 121b designates a position registration request signal of the adjacent base location group, and numeral 122 designates a position registration signal of the mobile station 6a.

As above described, the C-ch, S-ch allocation is performed for one station at most among the base stations 2a–2c forming the base station group 27a. One station among the base stations 2a–2c supplied with the C-ch, S-ch allocation transmits the position registration request signal 121a to the mobile station 6a in the period of T2 using the downward channel of C-ch. In order to avoid the collision of C-ch in the crossover zone 5 of FIG. 11, the base station groups 27b, 27c, 27d of the communication zones 4b, 4c, 4d having the crossover zone 5 commonly with the communication zone 4a transmit the position registration request signal 121b in the time shifting as shown in FIG. 15. In this case, the mobile station 6a newly enters the communication zone 4a of the base station group 27a at the time Ta of FIG. 15. Also the position registration request signal 121a includes the request signal (P) and the base station group identification signal (Q), and the base station group identification signal (Q) among these signals is common between the base stations 2a–2c to constitute the base station group 27a.

On receiving the position registration request signal 121a, the mobile station 6a returns the position registration signal 122 to the position registration request signal 121a received first from the time of Ta. The position registration signal 122 includes the registration signal (R), the mobile station identification code (S) and the base station group identification code (Q). In this case, the mobile station 6a stores the base station group identification code (Q), and next returns the position registration signal 122 only when the base station group identification code (Q) at receiving the position registration request signal 121a is different from the base station group identification code (Q) at previously returning the registration signal 122b.

FIG. 16 is a flow chart showing the control procedure of the mobile station 6a during the position registration. That is, if the mobile station 6a receives the position registration request signal 121a (step. ST11), the base station identification code (Q) in the position registration request signal 121a and the stored base station identification code (Q) are compared (step ST12). As a result, if both are coincident, the processing is finished directly. If both are not coincident, the position registration signal 122 is transmitted and the stored base station identification code (Q) is updated (step ST13), and then the processing is finished.

Information based on the position registration information 122 is transmitted to the switching station 1, and the position registration is performed. FIG. 17 is an explanation diagram showing an example of constitution of a memory storing the information of the position registration of the mobile stations 6a–6d. In FIG. 17, numerals 150a–150d designate addresses allocated to each of the mobile stations 6a–6d, and corresponding to the addresses 150a–150d, data 151a–151d are written so as to indicate in which position of the communication zones 4a–4j exists each of the mobile stations 6a–6d. In this case, the data structure is not limited to that as above described, but other data structure suitable for the applied device sort may be taken.

Also FIG. 18 is an explanation diagram showing a display example of the position indicator indicating the information of the position registration. The position information of each of the mobile stations 6a–6d is obtained, and corresponding one among the light emission diodes 152a, 152b, . . . is lit. For example, when the mobile station 6a is in the communication zone 4c, the light emission diode 152c is lit. Consequently, since the information of the position registration is stabled unless the plural communication zones 4a–4j are overlapped, the exact position display of the mobile stations 6a–6d becomes possible. In this case, the display method is not limited to that as above described, but method using a cathode ray tube display, a liquid crystal display or the like and being suitable for the applied device sort may be adopted.

Next, control from the call incoming to the speech end between the base station 2a and the mobile station 6a will be described. FIG. 19 is a sequence chart showing an example of the sequence. In FIG. 19, numeral 141 designates a call incoming signal from the base station 2a to the mobile station 6a, numeral 142 designates a call incoming response signal from the mobile station 6b to the base station 2a, and numeral 143 designates speech and communication on the S-ch between the base station 2a and the mobile station 6a. Numeral 144 designates C-ch, S-ch allocation release signal from the base station 2a to the switching station 1, numeral 145 designates C-ch, S-ch allocation signal from the switching station 1 to the base station 2b, and numeral 146 designates a speech confirmation signal from the base station 2a to the mobile station 6a. Numeral 147 designates a speech confirmation response signal from the mobile station 6a to the base station 2a, and numeral 148 designates a speech end signal in similar state. In this case, each of the signals 141–148 except for the C-ch, S-ch allocation release signal 144 and the C-ch, S-ch allocation signal 145, includes a base station group identification code peculiar to the base station group 27a. Also the call incoming response signal 142, the speech confirmation response signal 147 and the speech end signal 148 include a mobile station identification code.

The base station 2a transmits the call incoming signal 141 on C-ch to the mobile station 6a. On receiving this signal, the mobile station 6a returns the call incoming response signal 142 to the base station 2a, thereby both stations enter the speech communication 143 on the S-ch. During the speech communication 143 on the S-ch, such sequence is performed on the S-ch that the base station 2a transmits the speech confirmation signal 146 to the mobile station 6a periodically and the mobile station 6a returns the speech confirmation response signal 147. Finally, the mobile station 6a transmits the speech end signal 148 to the base station 2a, and then signals on the C-ch are transmitted or received between the mobile station 6a and the base station 2b. The C-ch, S-ch allocation release signal 144 and the C-ch, S-ch allocation signal 145 are in series of sequence between the base stations 2a, 2b and the switching station 1 so as to move the C-ch, S-ch allocation from the base station 2a to the base station 2b.

Consequently, if the same base station identification code is used in all base stations within the same base station group, the mobile communication system can be obtained in that the matching of the processing is scarcely deteriorated due to the number of the base stations within the base station group.

This sequence can be applied not only to sequence from the call incoming to the mobile station until the speech end as above described, but also to any sequence capable of transmitting or receiving the base station group identification code between the base station and the mobile station.

In the embodiment as above described, although the C-ch is one channel within one base station group, the C-ch may be plural channels which are changed one by one or simultaneously. Also the prescribed S-ch can be used as substitute for the C-ch in the entirely same function.

Further during the C-ch, S-ch allocation, the use allowance of C-ch and the start allowance of speech of S-ch are not supplied to the same base station, but may be supplied in one per each base station. The selection of the base stations to obtain such allowance may be performed not only by the priority previously set, but the selection may be performed in accordance with random numbers or the selection order may be circulated, and similar effects to the above-mentioned embodiment can be obtained in any case.

According to the invention as above described, allowance of communication of a control signal by C-ch and allowance of start of speech by S-ch within the same communication zone constituted by a plurality of base stations are supplied only to one base station at most within the communication zone, and the allowance is changed in sequence between respective base stations to constitute the communication zone, thereby the mobile communication system can be obtained in that useless position response due to difference between the base station identification code stored in the mobile station and the base station identification code included in signals on the downward channel of C-ch or nonresponse to signals for the communication processing can be prevented, and the collision of C-ch caused by the plurality of base stations existing within the same communication zone can be prevented.

Figure 3:
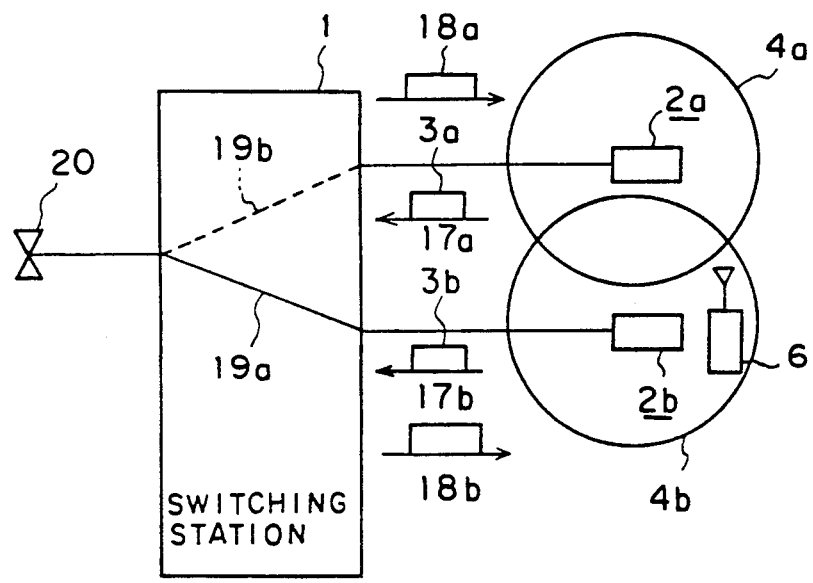
FIG. 3 is a system constitution diagram showing another mobile communication system in the prior art.
Figure 2:
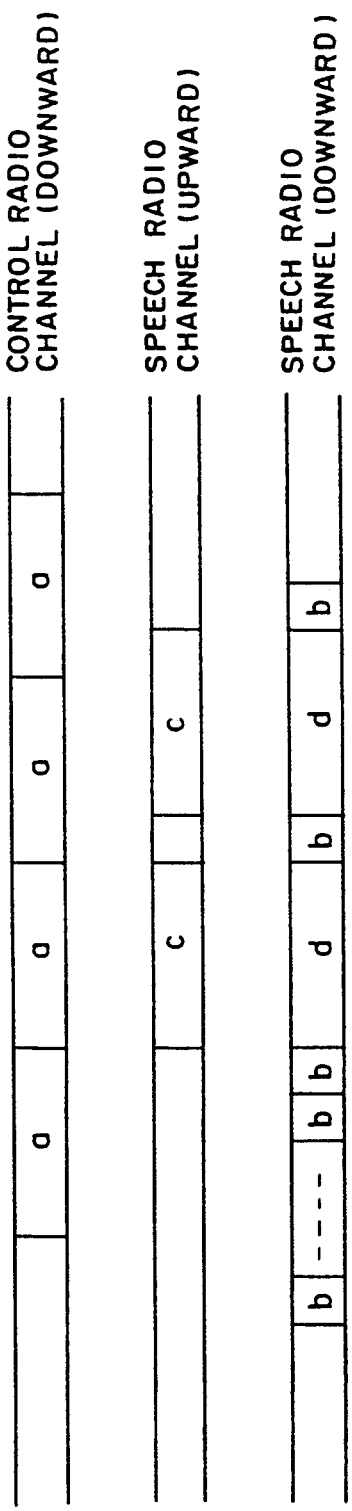
FIG. 2 is a timing chart showing transmission timing of signals transmitted or received in the system of FIG. 1.
Figure 20:
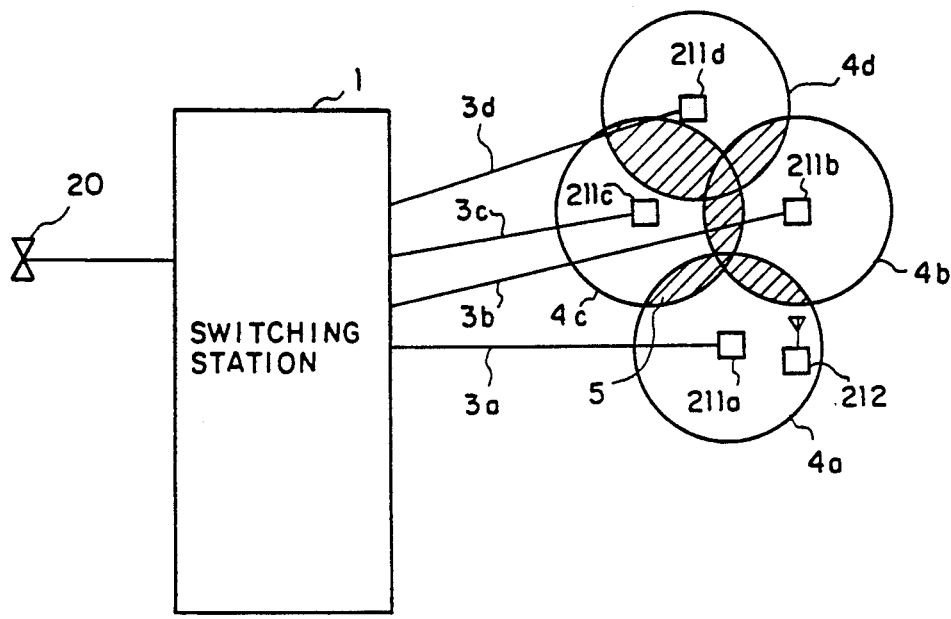
FIG. 20 is a system constitution diagram showing a mobile communication system in still another embodiment of the invention.

FIG. 20 is a system constitution diagram showing a mobile communication in still another embodiment of the invention. In FIG. 20, the mobile communication system comprises a switching station 1, a telephone terminal 20, communication zones 4a-4d, and wired networks 3a-3d. Parts in FIG. 20 designated by the same reference numerals as those in FIG. 3 are the same as or similar to the parts in the prior art. The mobile communication system also comprises a crossover zone 5 where the communication zones 4a-4d intersect each other, base stations 211a-211d to constitute the communication zones 4a-4d, and a mobile station 212 moving in a service area formed by the communication zones 4a-4d.

Figure 21:
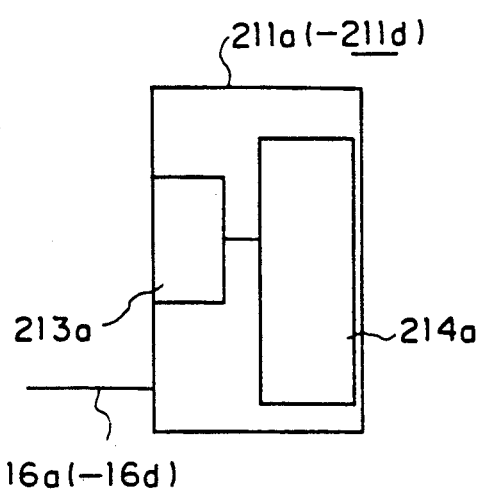
FIG. 21 is a block diagram showing schematic constitution of a basic station.
Figure 22:
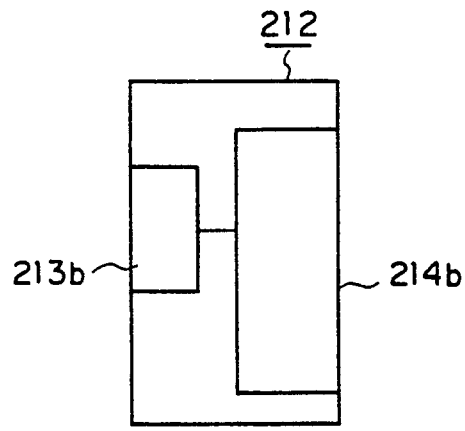
FIG. 22 is a block diagram showing schematic constitution of a mobile station.

FIG. 21 is a schematic constitution diagram of the base stations 211a-211d showing only a relevant part to the invention, and FIG. 22 is a schematic constitution diagram of the mobile station 212 showing only a relevant part to the invention. In FIGS. 21 and 22, SN ratio measuring circuits 213a, 213b for measuring the SN ratio of the received signal are disposed in the base stations 211a-211d or the mobile station 212. Numerals 214a, 214b designate transmitting/receiving circuits including a control section for processing the SN ratio measured by the SN ratio measuring circuit 213a or 213b.

Figure 23:
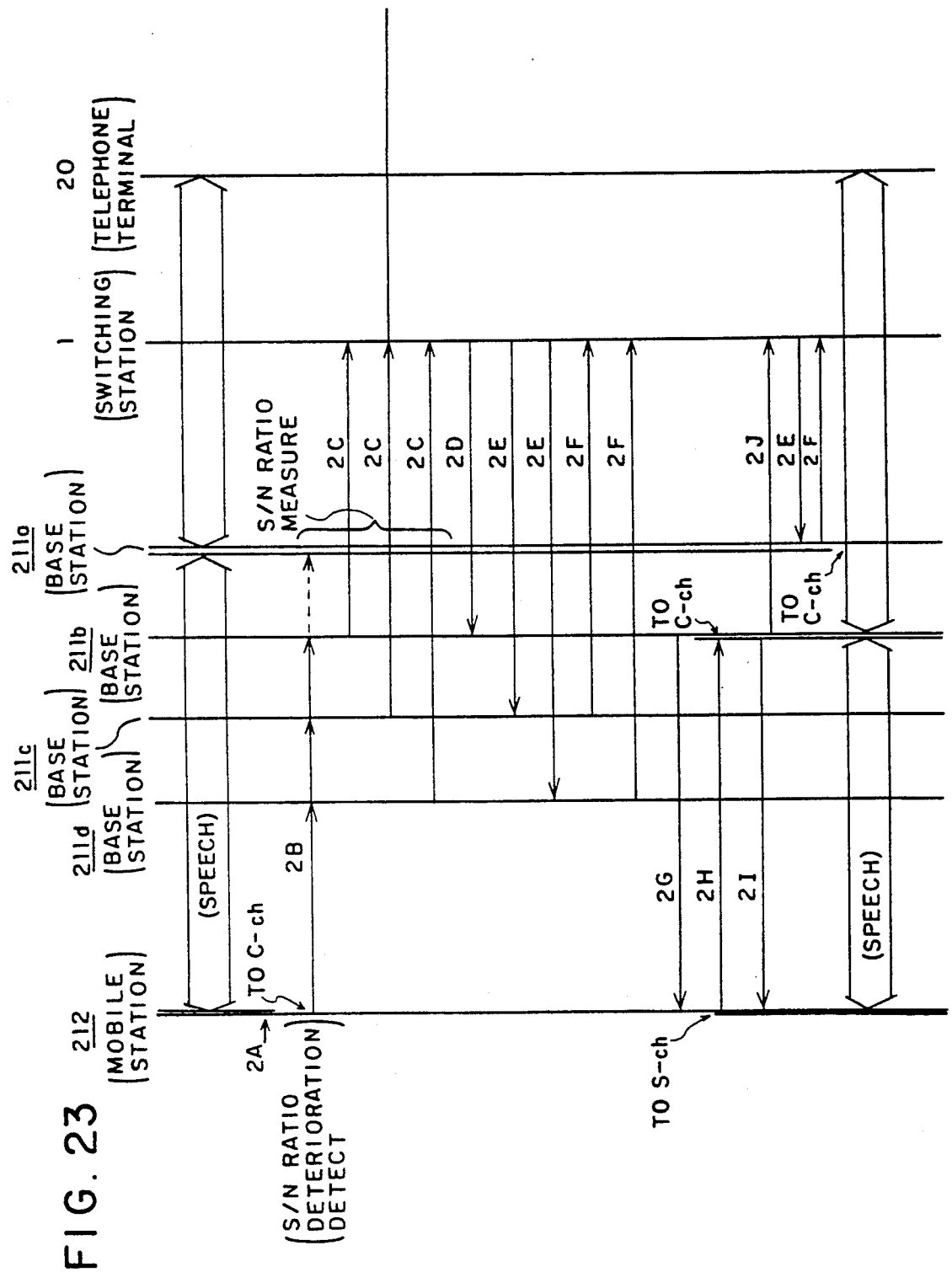
FIGS. 23-26 are sequence diagrams showing signal sequence at channel changing during speech.

Next, operation will be described. In this connection, FIG. 23 is a sequence chart showing signal sequence at the channel changing during speech. Such case will be described that the mobile station 212 in the communication zone 4a performing the communication on the S-ch with the base station 211a is moved through the crossover zone 5 to the communication zone 4b of the base station 211b as follows.

The mobile station 212 during speech on the S-ch always measures the SN ratio of the received signal from the base station 211 by the SN ratio measuring circuit 213b. As the mobile station 212 is moved from the communication zone 4b to the cross-over zone 5, the measured value of the SN ratio by the SN ratio measuring circuit 213b is deteriorated. If the measured value of the SN ratio becomes less than the standard value at the time 2A shown in FIG. 23, this is detected by the control section of the transmitting/receiving circuit 214b in the mobile station 212. Then the speech on the S-ch is immediately interrupted, and the process is transferred to the communication by the C-ch and the speech continuing request signal 2B requesting the speech continuing is transmitted onto the C-ch. The speech continuing request signal 2B includes the mobile station identification code of the mobile station 212.

The speech continuing request signal 2B is received in each of the base stations 211b-211d and the SN ratio is measured in the SN ratio measuring circuit 213a. In each of the base stations 211b-211d, the measured value of the SN ratio is processed by the control section in the transmitting/receiving circuit 214, and the continuing receiving signal 2C including the SN ratio information of the obtained receiving signal and the mobile station identification code is produced and transmitted to the switching station 1.

The switching station 1 analyzes the SN information included in the received continuing receiving signal 2C, and selects the base station indicating the value satisfying the standard value, for example, the base station 211b and transmits a base station selecting signal 2D to the base station 211b. In this case, if there are a plurality of base stations indicating the value satisfying the standard value, one station is selected among these base stations at random or in accordance with the priority previously set. A reset signal 2E is transmitted from the switching station 1 to each of the base stations 211c, 211d which are not selected, and each of the base stations 211c, 211d receiving the signal is reset to the original state and returns a reset receiving signal 2F to the switching station 2F.

On the other hand, the base station 211b receiving the base station selecting signal 2D transmits a mobile station call signal 2G including the mobile station identification code and the empty S-ch information to the mobile station 212, and then the base station 211b and the mobile station 212 are transferred to the communication on the assigned S-ch. The mobile station 212 receiving the mobile station call signal 2G transmits a connection confirmation signal 2H including the mobile station identification code and the base station identification code of the base station 211b, and the base station 211b receiving the connection confirmation signal 2H returns a connection confirmation response signal 2I to the mobile station 212 and transmits a speech path setting request signal 2J including the mobile station identification code to the switching station 1. And then the base station 211a is reset.

The switching station 1 receiving the speech path setting request signal 2J from the base station 211b sets a speech path between the base station 211b and the telephone terminal 20, and the mobile station 212 enters the speech state with the telephone terminal 20. In addition, the speech continuing request signal 2B may be received also by the base station 211a, but the reception of the signal 2B in this case shall be ignored.

The description has been made regarding the case that the base station selecting signal 2D is supplied to the base station having the SN ratio information included in the continuing receiving signal 2C indicating the value satisfying the standard value. However, the base station selecting signal 2D may be supplied to the base station where the continuing receiving signal 2C is first informed.

Figure 24:
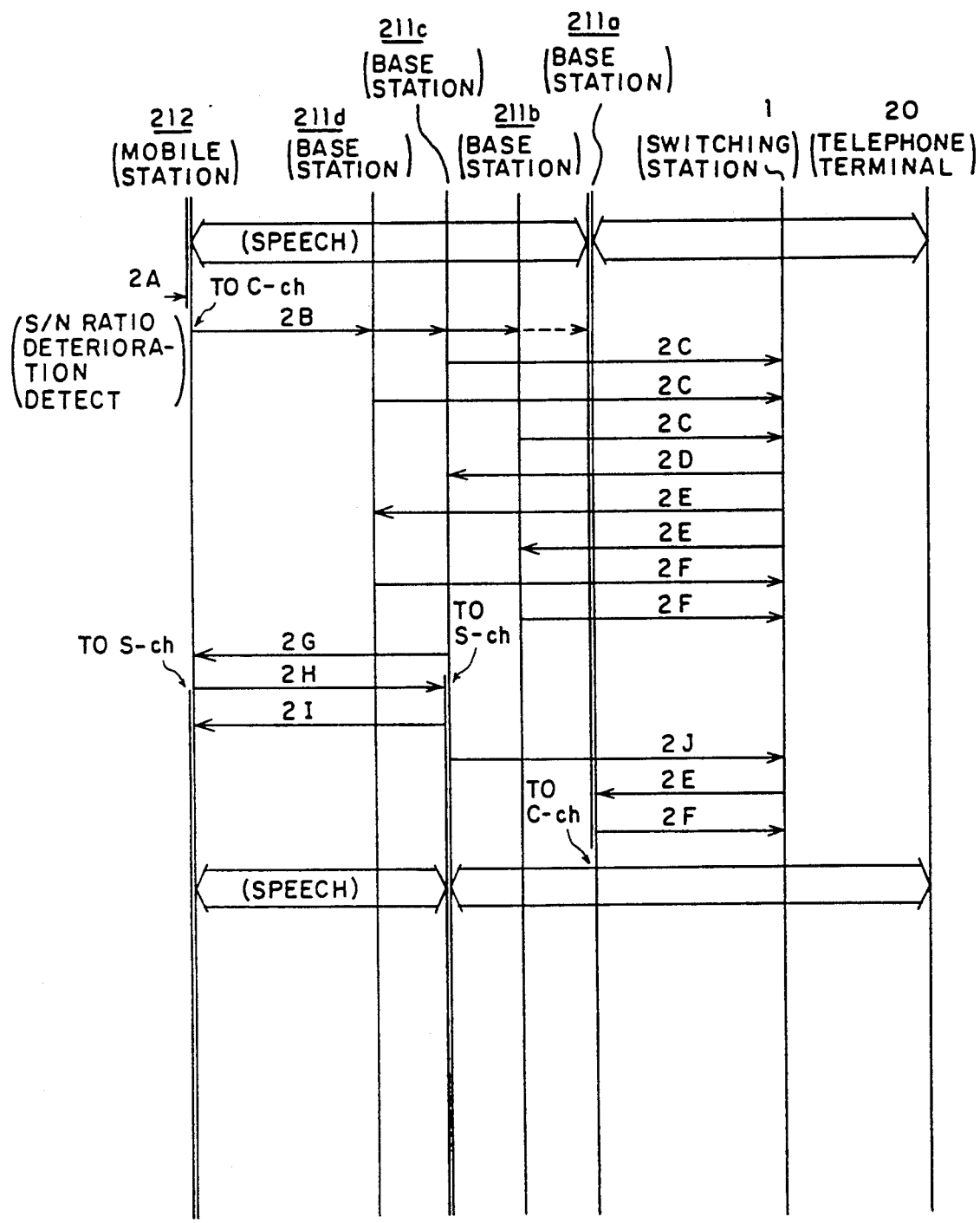

FIG. 24 is a sequence chart showing signal sequence at the channel changing during speech in such embodiment. FIG. 24 is the same as FIG. 23 in that the base stations 211b-211d receiving the speech continuing request signal 2B from the mobile station 212 transmit the continuing receiving signal 2C.

As shown in FIG. 24, the continuing receiving signal 2C is first transmitted by the base station 211c, and then transmitted by the base station 211d, the base station 211b in sequence. On receiving the continuing receiving signal 2C, the switching station selects the base station 211c where the signal is first transmitted, and transmits the base station selecting signal 2D to the base station 211c. Also the reset signal 2E is transmitted to the base stations 211b, 211d which are not selected, thereby these stations are reset to the original state. And then in similar manner to FIG. 23, through the selected base station 211c and the speech path set between the base station 211c and the telephone terminal 20 in the switching station 1, the mobile station 212 enters the speech state with the telephone terminal 20 and the base station 211a is reset.

In this case, since the SN ratio measuring circuit 213a of each of the base stations 211a-211d during speech monitors only the periodic SN ratio without relation to the channel changing, it may be omitted if not necessary. Also the the base stations 211a-211d as the transmission object of the base station selecting signal 2D are not limited to that first informing the continuing receiving signal 2C to the switching station 1, but may be arbitrary.

The invention is not limited to the above-mentioned embodiments, but, for example, the base station selecting signal may be supplied to the base station which receives the speech continuing request signal from the mobile station in the best SN ratio.

Figure 25:
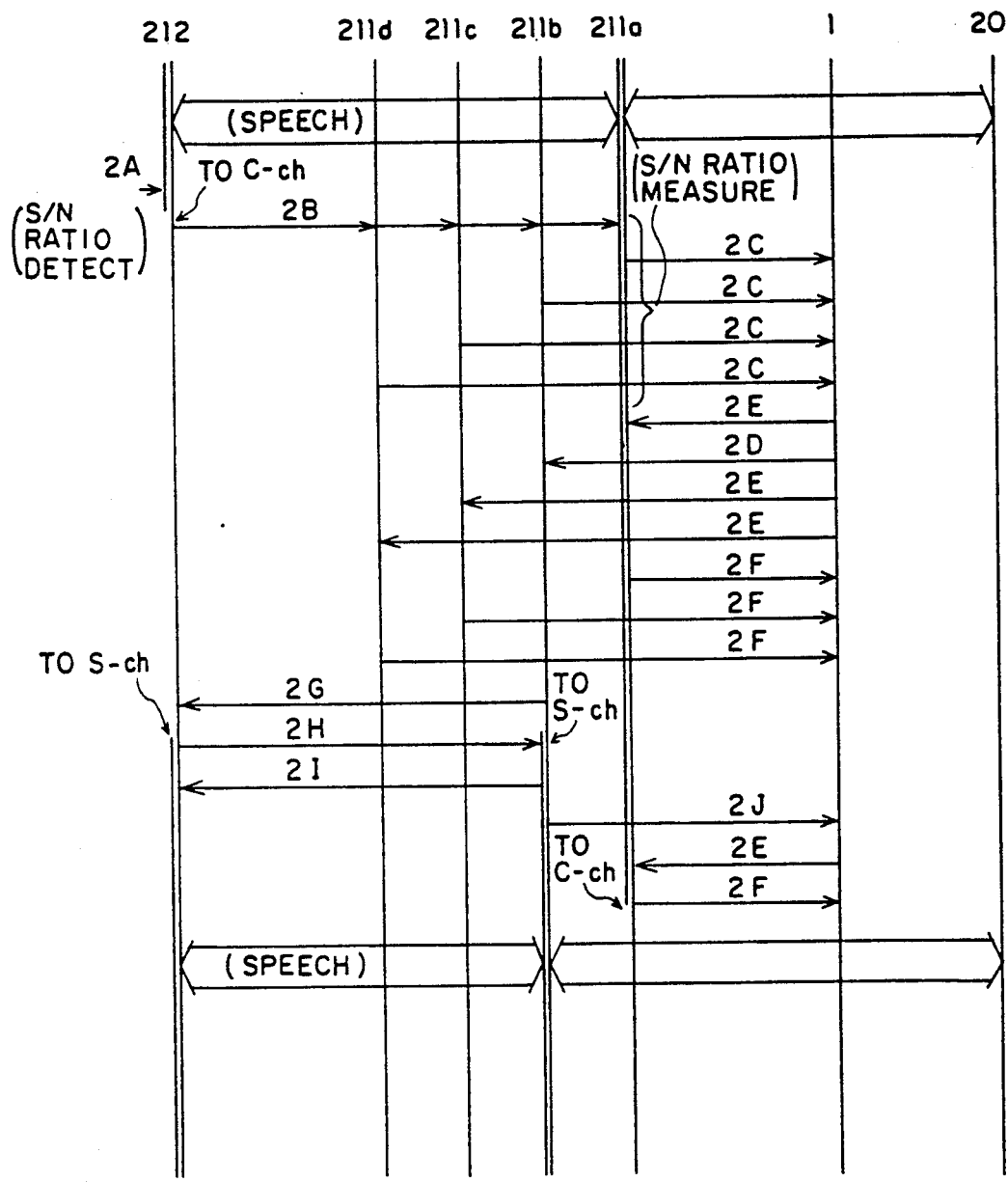

FIG. 25 is a sequence chart showing signal sequence at the channel changing during speech in such embodiment. FIG. 25 is the same as FIG. 23 in that each base station receives the speech continuing request signal B from the mobile station.

In each of the base stations 211a-211d including the base station 211a during speech at present, if the speech continuing request signal 2B is received, the SN ratio of the received signal is measured in the respective SN ratio measuring circuit 213, and the measured value is processed in the control section of the transmitting-/receiving circuit 214a. Next, each of the base stations 211a-211d generates the mobile station identification code of the mobile station 212 transmitting the speech continuing request signal 2B and the continuing receiving signal 2C including the SN ratio information of the received signal, and transmits the signals from the transmitting/receiving circuit 214a to the switching station 1. On receiving the continuing receiving signal 2C from each of the base stations 211b-211d, the switching station 1 analyzes the SN ratio information included in the continuing receiving signal 2C, and selects the base station having the best value, for example, the base station 211b and transmits a base station selecting signal 2D to the base station 211b. Also the switching station 1 transmits a reset signal 2E to the base stations 211a, 211c, 211d which are not selected, and each of the base stations 211a, 211c, 211d receiving the signal 2E is reset to the original state and returns a reset receiving signal 2F to the switching station 1.

On the other hand, the base station 211b receiving the base station selecting signal 2D transmits a mobile station call signal 2G including the mobile station identification code and the empty S-ch information to the mobile station 212. And then in similar manner to FIG. 23, through the selected base station 211c and the speech path set between the base station 211c and the telephone terminal 20 in the switching station 1, the mobile station 212 enters the speech state with the telephone terminal 20.

Since the base station selecting signal is supplied to the base station receiving the speech continuing request signal in the best SN ratio, the mobile station can perform speech using S-ch with the base station in the best communication state and the more stable and better speech quality can be obtained.

Further, the invention is not limited to these embodiments, but, for example, the speech path may be confirmed on the S-ch after changing the S-ch during speech, and if it can not be confirmed, the state before the changing may be restored.

Figure 26:
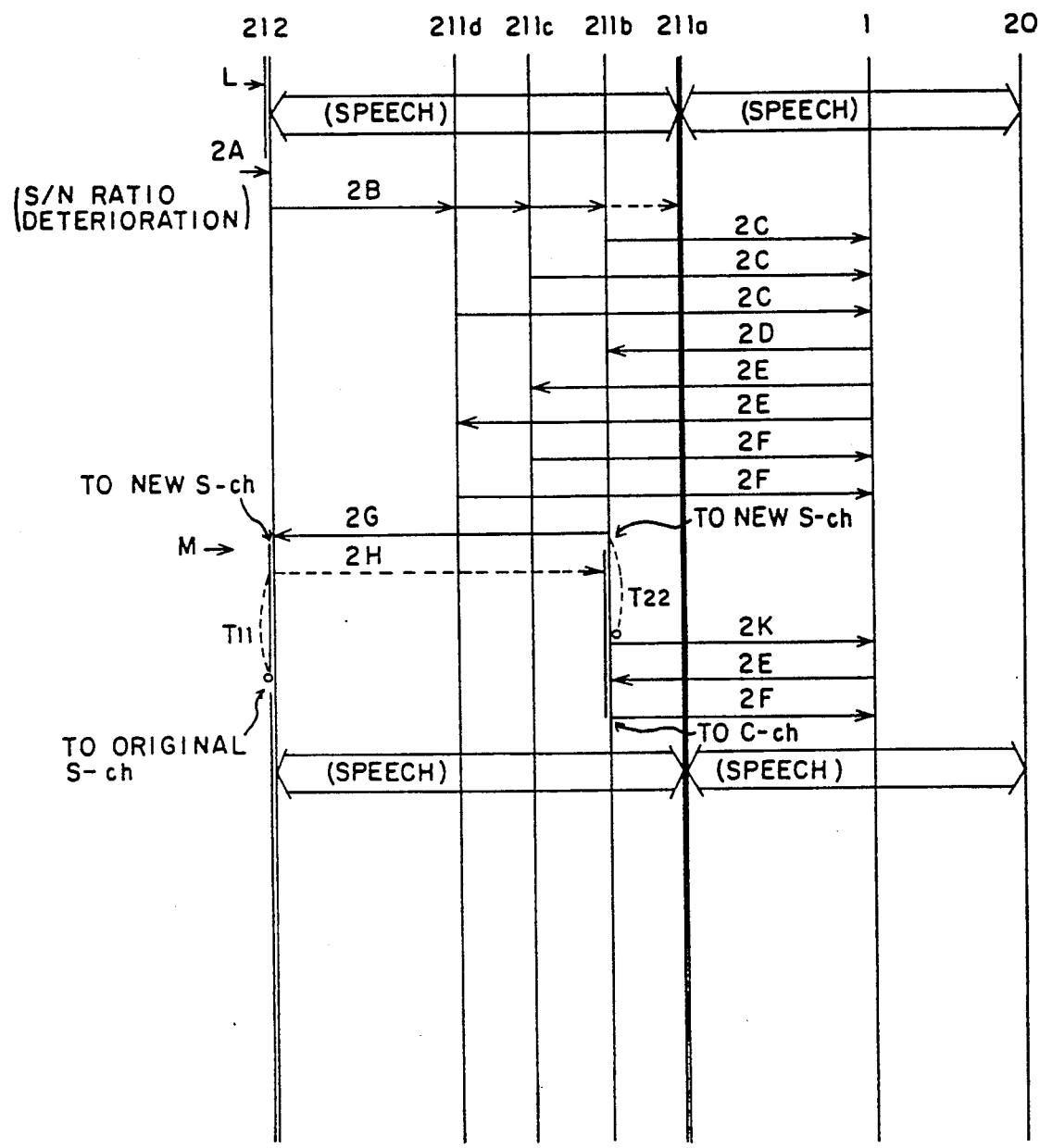

FIG. 26 is a sequence chart showing signal sequence at the channel changing during speech in such embodiment. FIG. 26 is the same as FIG. 23 in that the base station 211b transmits the mobile station call signal 2G to the mobile station 212.

The mobile station 212 receives a mobile station call signal 2G including the mobile station identification code of the mobile station 212 and the empty S-ch information transmitted by the base station 211b, and then the mobile station 212 is transferred to new communication on S-ch. In this case, the mobile station 212 receiving the mobile station call signal 2G transmits a connection confirmation signal 2H including the mobile station identification code and the base station identification signal of the base station 211b, but it is assumed that the connection confirmation signal 2H is not received in the base station 211 by any cause.

The mobile station 212 waits a connection confirmation response signal 2J from the base station 211b for the prescribed time T11 after transmitting the connection confirmation signal 2H. In this case, since the connection confirmation response signal 2J can not be received for the prescribed time T11, the S-ch is returned to the channel before the time 2A. Also the base station 211b waits the connection confirmation signal 2H from the mobile station 212 for the prescribed time T22 after transmitting the mobile station call signal 2G, but since the connection confirmation signal 2H can not be received for the prescribed time T22, as reset request signal 2K is transmitted to the switching station 1. The switching station 1 receiving the reset request signal 2K resets the base station 211b, thereby the speech between the mobile station 212 and the base station 211b is restored.

Since the speech path is confirmed on the S-ch after changing the S-ch during speech, and if it can not be confirmed, the state before the changing is restored, even if the channel changing fails during speech, such state is prevented that the speech is suddenly interrupted.

In the embodiments as above described, although the communication destination of the mobile station is the telephone terminal, it may be other terminal connected through the mobile station or public network, or the direction of transmission and reception of the connection confirmation signal and the connection confirmation response signal may be made the reverse direction. Also in the embodiments, although the base station number within the same communication zone is one and only one mobile station is shown, the number of the base stations and the mobile stations may be arbitrary and the same communication zone may be constituted by a plurality of base stations. Similar effects to the embodiments can be obtained in any of the modifications.

According to the invention as above described, the mobile station also has the SN ratio measuring function of received signals and always measures the SN ratio of S-ch during speech, and if the deterioration of the SN ratio is detected, speech on the S-ch is temporarily interrupted and transferring to the C-ch is automatically performed and a speech continuing request signal is transmitted and the S-ch is changed by the mobile station call signal transmitted by one base station receiving the speech continuing request signal, thereby the SN ratio of received signals in the base station from the mobile station need not be always measured or monitored by the switching station, and even if the SN ratio information of all base stations in the adjacent communication zone is not collected in matching with the S-ch of frequency used by the communication zone before the movement, the moving destination of the mobile station can be discriminated, thus the channel changing system during speech can be obtained in that the load of the switching station at the channel changing during speech can be significantly reduced.

What is claimed is:

1. A mobile communication system comprising:

a switching station;

a plurality of base stations connected to said switching station;

a plurality of mobile stations moving in a service area formed by combination of communication zones, each of which zones includes at least one of said base stations;

said base stations and said mobile stations having a speech radio channel for speech and a control radio channel for communication of communication control signals, said speech radio channel and said control radio channel including an upward channel from the mobile stations to the base stations and a downward channel from the base stations to the mobile stations respectively, at least one of said communication zones including a selected plurality of base stations, selected from among said plurality of base stations, installed within said zone;

one of said selected plurality of base stations installed within said at least one communication zone having allocated thereto a radio channel to be used for a selected specific case only and being set in the normally receiving state, and said one base station and said switching station having means for controlling the operation thereof such that if said one base station receives a general communication request signal through the upward channel of the radio channel allocated for the selected specific case only from a requesting mobile station within said at least one communication zone, said switching station commands general communication to said base station receiving the general communication request signal from the requesting mobile station and transmits a general communication signal of a prescribed signal to the requesting mobile station.

2. A mobile communication system as set forth in claim 1, wherein the requesting mobile station to request the general communication transmits a base station identification code allocated to the communication zone in which said requesting mobile station exists at present together with a general communication request code, and one of said base stations within the service area having means for transmitting the base station identification code allocated to the communication zone including the requesting base station together with the general communication zone.

3. A mobile communication system as set forth in claim 1, wherein each of said mobile stations within the service area is previously divided into groups and a group identification code is allocated to each group, and the requesting mobile station to request the general communication transmits a group identification code of the group as the object of the general communication together with a general communication request code, and one of said base stations within the service area having means for transmitting the group identification code of the group as the object of the general communication together with the general communication request code.

4. A mobile communication system as set forth in claim 1, wherein a requesting mobile station to request the general communication transmits a base station group identification code indicating the communication zone as the object of the general communication together with a general communication request code, and one of said base stations within the base station group corresponding to the base station group identification code among the base stations within the service area having means for transmitting the general communication signal.

5. A mobile communication system comprising:

a switching station;

a base station group including a plurality of base stations connected to said switching station;

a plurality of mobile stations moving in a service area formed by a combination of communication zones constituted by said base station group; and said base stations and said mobile stations having a speech radio channel for speech and a control radio channel for bi-directional communication of communication control signals, said speech radio channel and said control radio channel including an upward channel from the mobile stations to the base stations and a downward channel from the base stations to the mobile stations respectively, said bi-directional communication by both upward and downward channels of the control radio channel and newly starting the bi-directional speech by both upward and downward channels of the speech radio channel are supplied to one of said mobile stations at most regarding one control radio channel among the plurality of base stations within the communication zone, and to a base station supplied having means for bi-directional communication by both channels of the control radio channel and starting the bi-directional speech by both channels of the speech radio channel changed in sequence among the base stations within the same communication zone;

wherein a base station group having means for allocating an identification code to one of said base station groups, and one of said mobile stations and one of said base stations as its communication destination uses the base station group identification code of the group to which the base station belongs during communication.

6. A mobile communication system as set forth in claim 5, wherein one of said plurality of mobile stations stores a base station group identification code received from one of said plurality of base stations and transmits a position registration signal only when a newly received base station group identification code is different from a stored base station group identification code.

7. A mobile communication system as set forth in claim 5, including a position display device installed in the switching station for indicating the registration position of each mobile station within the service area.

* * * * *